US011926505B2

(12) United States Patent
Iio

(10) Patent No.: US 11,926,505 B2
(45) Date of Patent: Mar. 12, 2024

(54) ELEVATOR CONTROL DEVICE AND CONTROL METHOD

(71) Applicant: Mitsubishi Electric Corporation, Tokyo (JP)

(72) Inventor: Mitsutoshi Iio, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1254 days.

(21) Appl. No.: 16/465,579

(22) PCT Filed: Feb. 6, 2017

(86) PCT No.: PCT/JP2017/004163
§ 371 (c)(1),
(2) Date: May 31, 2019

(87) PCT Pub. No.: WO2018/142603
PCT Pub. Date: Aug. 9, 2018

(65) Prior Publication Data
US 2019/0344999 A1 Nov. 14, 2019

(51) Int. Cl.
*B66B 1/46* (2006.01)
*B66B 1/24* (2006.01)
*B66B 3/00* (2006.01)

(52) U.S. Cl.
CPC ............ *B66B 1/468* (2013.01); *B66B 1/2408* (2013.01); *B66B 3/002* (2013.01); *B66B 2201/101* (2013.01); *B66B 2201/103* (2013.01); *B66B 2201/4615* (2013.01); *B66B 2201/4646* (2013.01)

(58) Field of Classification Search
CPC ....... B66B 1/468; B66B 1/2408; B66B 3/002; B66B 2201/101; B66B 2201/103; B66B 2201/4615; B66B 2201/4646
See application file for complete search history.

(56) References Cited

U.S. PATENT DOCUMENTS

2006/0151256 A1* 7/2006 Lee ......................... B66B 1/468 187/391
2018/0186597 A1* 7/2018 Kuboyama ............. B66B 1/468

FOREIGN PATENT DOCUMENTS

JP 56-52373 A 5/1981
JP 2003-73046 A 3/2003
(Continued)

OTHER PUBLICATIONS

International Search Report and Written Opinion dated Apr. 18, 2017 for PCT/JP2017/004163 filed on Feb. 6, 2017, 8 pages including English Translation of the International Search Report.

*Primary Examiner* — Jeffrey Donels
(74) *Attorney, Agent, or Firm* — XSENSUS LLP

(57) ABSTRACT

An elevator control device recognizes a destination floor of a user from a voice of the user input to a voice input device, registers a voice car call corresponding to the recognized destination floor, generates stop floor information including a stop floor at which a car stops before the car arrives at the destination floor after the registration of the voice car call, and performs, as a voice announcement that follows the generated stop floor information, any one of a first announcement for notifying of the stop floor in order of floors at which the car stops and a second announcement for notifying of how many floors the car stops at before arriving at the destination floor.

5 Claims, 5 Drawing Sheets

(56) References Cited

FOREIGN PATENT DOCUMENTS

| | | | | |
|---|---|---|---|---|
| JP | 2015-51841 | A | 3/2015 | |
| JP | 5950808 | B2 | 7/2016 | |
| WO | WO-2012002702 | A2 * | 1/2012 | ............... B66B 1/34 |
| WO | WO-2012081082 | A1 * | 6/2012 | ............. B66B 1/468 |

* cited by examiner

ELEVATOR CONTROL DEVICE AND CONTROL METHOD

CROSS-REFERENCE TO RELATED APPLICATION

The present application is based on PCT filing PCT/JP2017/004163, filed Feb. 6, 2017, the entire contents of which are incorporated herein by reference.

TECHNICAL FIELD

The present invention relates to an elevator control device and control method for controlling a voice announcement of an elevator configured to allow a user to register a destination floor by voice.

BACKGROUND ART

Hitherto, there has been proposed an elevator configured such that, when a user of the elevator operates a car call button installed on a car operation panel provided in a car, a voice announcement is performed in response to the button operation (see, for example, Patent Literature 1 and Patent Literature 2).

CITATION LIST

Patent Literature

[PTL 1] JP 5950808 B2
[PTL 2] JP 2003-73046 A

SUMMARY OF INVENTION

Technical Problem

In an elevator configured to allow a user to register a destination floor by voice, there has been a problem in that, when a visually impaired person who has registered a destination floor by voice is not notified of a stop floor at which a car stops from a floor at which the person rides in the car before the car arrives at the destination floor, the person may not only feel uneasy, but may erroneously get out of the car at a floor different from the destination floor.

The present invention has been made in order to solve the above-mentioned problem, and has an object to provide an elevator control device and control method for alleviating a feeling of uneasiness that may be caused when a visually impaired person has registered a destination floor by voice, and for preventing the visually impaired person from erroneously getting out of a car at a floor different from the destination floor.

Solution to Problem

According to one embodiment of the present invention, there is provided an elevator control device including: a voice recognition unit configured to recognize a destination floor of a user from a voice of the user input to a voice input device; and an elevator control unit configured to register a voice car call corresponding to the destination floor recognized by the voice recognition unit, generate stop floor information including a stop floor at which a car stops before the car arrives at the destination floor after the registration of the voice car call, and control a voice output device such that the voice output device performs a voice announcement that follows the generated stop floor information, wherein the elevator control unit is configured to perform, as the voice announcement, any one of a first announcement for notifying of the stop floor in order of floors at which the car stops, and a second announcement for not of how many floors the car stops at before arriving at the destination floor.

According to one embodiment of the present invention, there is provided an elevator control method including: a voice recognition step of recognizing a destination floor of a user from a voice of the user input to a voice input device; and an elevator control step of registering a voice car call corresponding to the destination floor recognized in the voice recognition step, generating stop floor information including a stop floor at which a car stops before the car arrives at the destination floor after the registration of the voice car call, and controlling a voice output device such that the voice output device performs a voice announcement that follows the generated stop floor information, wherein the elevator control step includes performing, as the voice announcement, any one of a first announcement for notifying of the stop floor in order of floors at which the car stops, and a second announcement for notifying of how many floors the car stops at before arriving at the destination floor.

Advantageous Effects of Invention

According to one embodiment of the present invention, it is possible to provide the elevator control device and control method for alleviating a feeling of uneasiness that may be caused when a visually impaired person has registered a destination floor by voice, and for preventing the visually impaired person from erroneously getting out of a car at a floor different from the destination floor.

DESCRIPTION OF EMBODIMENTS

Now, an elevator control device and control method according to exemplary embodiments of the present invention are described with reference to the accompanying drawings. In the illustration of the drawings, the same components or corresponding components are denoted by the same reference symbols, and the overlapping description thereof is herein omitted.

First Embodiment

Figure 1:
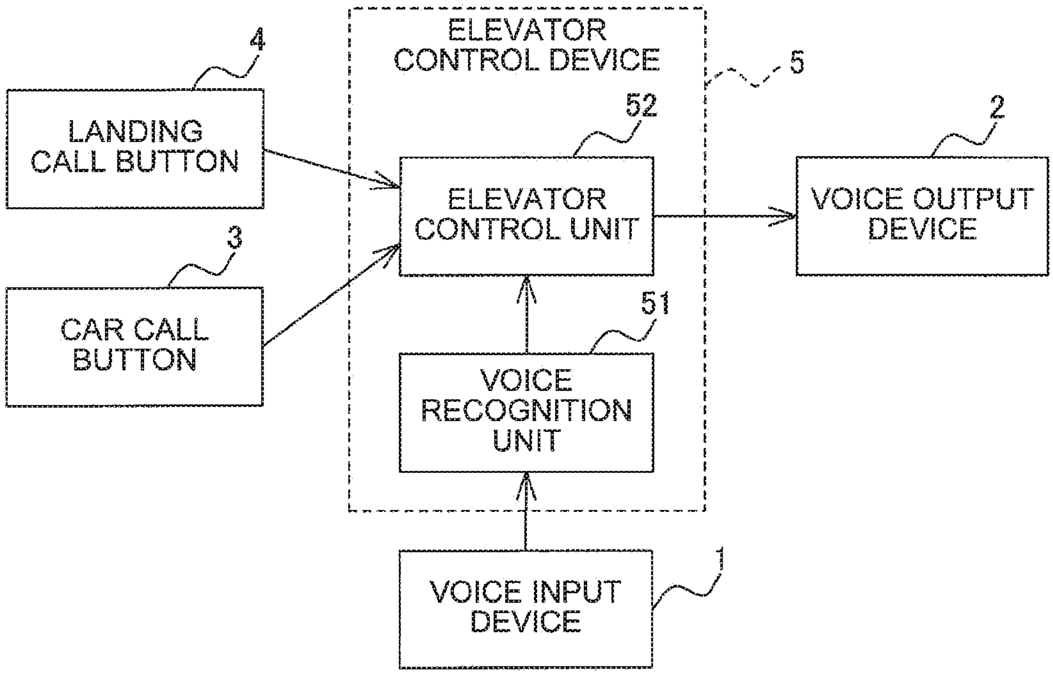
FIG. 1 is a block diagram for illustrating a configuration of an elevator control device according to a first embodiment of the present invention.

FIG. 1 is a block diagram for illustrating a configuration of an elevator control device 5 according to a first embodiment of the present invention. In FIG. 1, not only the control device 5, but also a voice input device 1, a voice output device 2, a car call button 3, and a landing call button 4, which are connected to the control device 5, are illustrated together.

The voice input device 1 is installed on a car operation panel provided in a car. The voice input device 1 is used by a user to emit a voice of a user's destination floor after riding in the car, to thereby register a call (hereinafter referred to as "voice car call") for stopping the car at the user's destination floor, and is configured to allow the user to input the user's voice. The voice input device 1 may be formed with use of, for example, a microphone.

The voice output device 2 is installed on the car operation panel, and outputs a voice announcement in accordance with control of the control device 5. The voice output device 2 may be formed with use of, for example, a speaker.

The car call button 3 is installed on the car operation panel, and is configured to be able to input, to the control device 5, a call (hereinafter referred to as "button car call") for stopping the car at a destination floor of a user by being pressed by the user after the user rides in the car. The landing call button 4 is installed on a landing operation panel of a floor of a landing, and is configured to be able to input, to the control device 5, a call (hereinafter referred to as "landing call") for stopping the car at the landing floor by being pressed by a user.

The control device 5 is implemented by, for example, a microcomputer configured to execute arithmetic processing, a read only memory (ROM) configured to store program data, fixed value data, and other such data, and a random access memory (RAM) in which data stored therein is updated to be sequentially rewritten.

The control device 5 includes a voice recognition unit 51 and an elevator control unit 52. The voice recognition unit 51 recognizes a destination floor of a user from a voice of the user input to the voice input device 1, and outputs the recognized destination floor to the elevator control unit 52. A known technology may be applied to implement the voice recognition unit 51, and hence a detailed description of the voice recognition unit 51 is omitted.

The elevator control unit 52 performs overall control of the elevator, and performs the following control, in particular. Specifically, the elevator control unit 52 registers a button car call input from the car call button 3, a voice car call for stopping the car at the destination floor, which is input from the voice recognition unit 51, and a landing call input from the landing call button 4, and controls the operation of the car in accordance with the registered calls.

Further, when a voice car call is registered, the elevator control unit 52 generates, based on the voice car call and on a button car call and a landing call that have already been registered, stop floor information including a stop floor at which the car stops before the car arrives at the destination floor corresponding to the registered voice car call after the registration of the voice car call. The elevator control unit 52 controls the voice output device 2 such that the voice output device 2 performs a first announcement as a voice announcement that follows the generated stop floor information.

Herein, the first announcement is an announcement for notifying of a stop floor included in the generated stop floor information in order of floors at which the car stops.

In this manner, the voice recognition unit 51 recognizes a destination floor of a user from a voice of the user input to the voice input device 1. Further, the elevator control unit 52 registers a voice car call corresponding to the destination floor recognized by the voice recognition unit 51, and generates stop floor information including a stop floor at which the car stops before the car arrives at the destination floor after the registration of the voice car call. Still further, the elevator control unit 52 controls the voice output device 2 such that the voice output device 2 performs the first voice announcement as the voice announcement that follows the generated stop floor information.

The function of the voice recognition unit 51 may be provided to, for example, the car operation panel, or may be provided to a control panel, which is generally installed in a machine room. Further, for example, all of the functions of the elevator control unit 52 may be provided to the control panel, or a part of the functions may be provided to the car operation panel, and the rest of the functions may be provided to the control panel.

Figure 2:
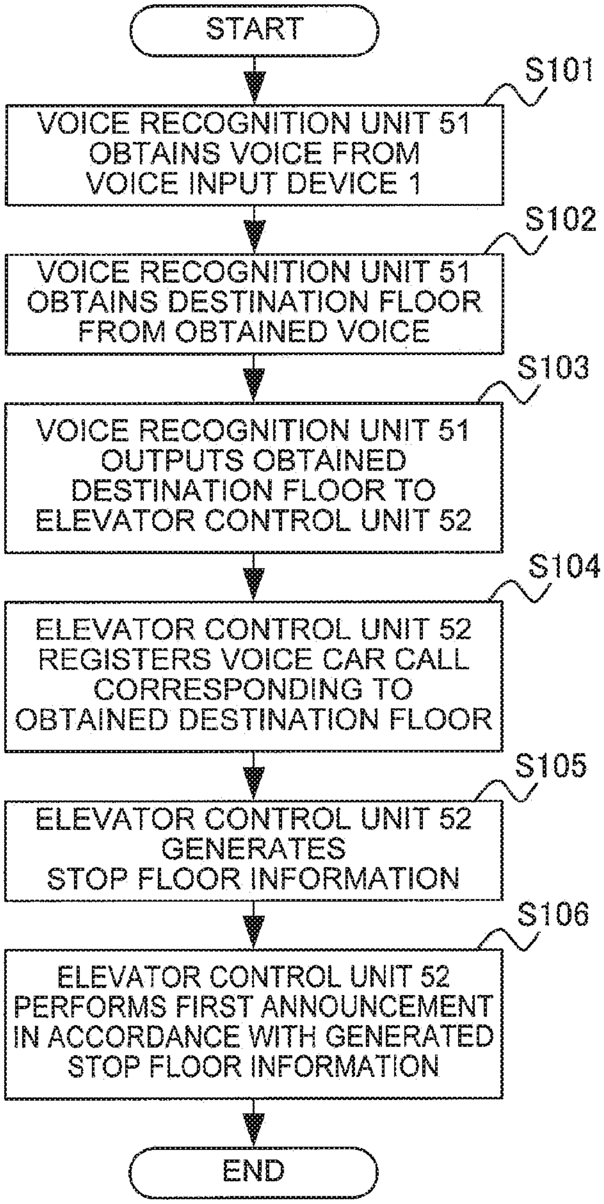
FIG. 2 is a flowchart for illustrating a series of processing steps to be performed by the elevator control device according to the first embodiment of the present invention.

Next, a series of processing steps of the control device 5 according to the first embodiment is described with reference to FIG. 2. FIG. 2 is a flowchart for illustrating a series of processing steps to be performed by the elevator control device 5 according to the first embodiment of the present invention.

In Step S101, the voice recognition unit 51 obtains a voice from the voice input device 1, and the processing proceeds to Step S102. In Step S102, the voice recognition unit 51 recognizes and obtains a destination floor from the voice obtained in Step S101, and the processing proceeds to Step S103.

In Step S103, the voice recognition unit 51 outputs the destination floor obtained in Step S102 to the elevator control unit 52, and the processing proceeds to Step S104. In Step S104, the elevator control unit 52 registers a voice car call corresponding to the destination floor output in Step S103, and the processing proceeds to Step S105.

In Step S105, the elevator control unit 52 generates stop floor information based on the voice car call registered in Step S104 and on a button car call and a landing call that have already been registered, and the processing proceeds to Step S106.

As an example, it is assumed that, before a voice car call having a destination floor of a 10th floor is registered in Step S104, button car calls having destination floors of a 3rd floor and a 5th floor and a landing call having a landing floor of a 7th floor have already been registered. In this case, in Step S105, the elevator control unit 52 generates stop floor information indicating that stop floors at which the car stops before the car arrives at the 10th floor, which is the destination floor corresponding to the voice car call, after the registration of the voice car call are the 3rd floor, the 5th floor, and the 7th floor.

In Step S106, the elevator control unit 52 performs a first announcement in accordance with the stop floor information generated in Step S105, and the processing ends.

As an example, it is assumed that the destination floor corresponding to the voice car call registered in Step S104 is the 10th floor, and that the stop floors included in the stop floor information generated in Step S105 are the 3rd floor, the 5th floor, and the 7th floor. In this case, the elevator control unit 52 gives, as the first announcement, an announcement "This elevator will stop at the 3rd floor, the 5th floor, and the 7th floor before arriving at your floor registered by voice", for example.

As described above, the elevator control unit 52 is configured to perform the first announcement for notifying of a stop floor at which the car stops before the car arrives at a destination floor registered by voice in order of floors at which the car stops. Therefore, a user who has input the destination floor to the voice input device 1 by voice can be notified of a stop floor at which the car stops before the car arrives at the destination floor registered by voice.

In the first embodiment, there has been given, as an example, the case in which the elevator control unit 52 is configured to perform the first announcement as the voice announcement that follows the stop floor information, but the present invention is not limited thereto. Specifically, the voice announcement to be performed by the elevator control unit 52 may be a second announcement instead of the first announcement. Herein, the second announcement is an announcement for notifying of how many floors the car stops at before arriving at a destination floor corresponding to a voice car call.

The elevator control unit 52 may thus be configured to perform the second announcement as the voice announcement that follows the stop floor information.

As an example, it is assumed that the destination floor corresponding to the voice car call registered in Step S104 is the 10th floor, and that the stop floors included in the stop floor information generated in Step S105 are the 3rd floor, the 5th floor, and the 7th floor. In this case, the elevator control unit 52 gives, as the second announcement, an announcement "This elevator will stop fourth at your floor registered by voice", for example.

When the configuration of the elevator control unit 52 is changed as described above, the user who has input the destination floor to the voice input device 1 by voice can be notified of how many floors the car stops at before arriving at the destination floor registered by voice.

According to the first embodiment described above, the following configuration is provided: a destination floor of a user is recognized from a voice of the user, a voice car call corresponding to the recognized destination floor is registered, stop floor information including a stop floor at which the car stops before the car arrives at the destination floor after the registration of the voice car call is generated, and any one of the first announcement and the second announcement is performed as a voice announcement that follows the generated stop floor information. With this configuration, it is possible to alleviate a feeling of uneasiness that may be caused when a visually impaired person has registered the destination floor by voice, and to prevent the visually impaired person from erroneously getting out of the car at a floor different from the destination floor.

Second Embodiment

In a second embodiment of the present invention, a description is given of a control device 5 configured to, in addition to the configuration of the first embodiment, when there has been a change in a stop floor before the car arrives at a destination floor corresponding to a voice car call after a voice announcement is performed, further perform a voice announcement that follows the change. In the second embodiment, a description of the same features as those of the first embodiment described above is omitted, and a difference from the first embodiment described above is mainly described.

Figure 3:
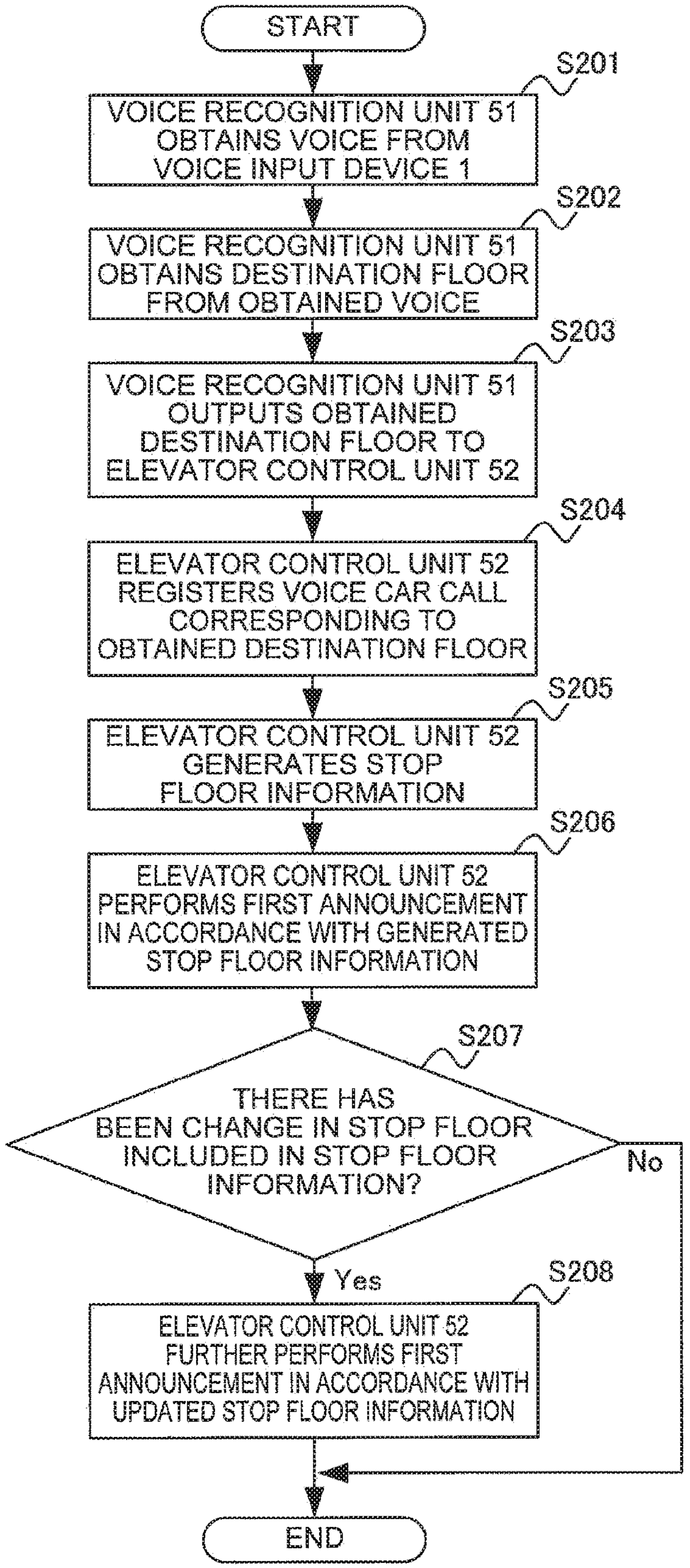
FIG. 3 is a flowchart for illustrating a series of processing steps to be performed by an elevator control device according to a second embodiment of the present invention.

FIG. 3 is a flowchart for illustrating a series of processing steps to be performed by the elevator control device 5 according to the second embodiment of the present invention. As illustrated in FIG. 3, the control device 5 sequentially executes processing steps of Step S201 to Step S206, which are similar to Step S101 to Step S106 of FIG. 2 described above, and the processing proceeds to Step S207.

In Step S207, the elevator control unit 52 determines whether or not, before the car arrives at the destination floor corresponding to the voice car call after the first voice announcement is performed, there has been a change in the stop floor included in the stop floor information by an operation of the car call button 3 or the landing call button 4 by a user.

When it is determined in Step S207 that there has been a change in the stop floor, the processing proceeds to Step S208. Meanwhile, when it is determined in Step S207 that there is no change in the stop floor, the processing ends.

In Step S208, the elevator control unit 52 updates the stop floor information such that the stop floor information includes the changed stop floor, and further performs a first announcement that follows the updated stop floor information, and the processing ends.

As an example, it is assumed that a destination floor corresponding to the voice car call registered in Step S204 is the 10th floor and that stop floors included in the stop floor information generated in Step S205 are the 3rd floor, the 5th floor, and the 7th floor. It is further assumed that, after the first announcement is performed in Step S206, a user operates the car call button 3 to register a button car call having a destination floor of a 6th floor.

In the above-mentioned case, in Step S207, the elevator control unit 52 determines that there has been a change in the stop floor because the stop floors have been changed from the 3rd floor, the 5th floor, and the 7th floor to the 3rd floor, the 5th floor, the 6th floor, and the 7th floor. Further, in Step S208, the elevator control unit 52 updates the stop floor information such that the stop floor information includes the 3rd floor, the 5th floor, the 6th floor, and the 7th floor, which are the changed stop floors, and performs again, as the first announcement that follows the updated stop floor information, a voice announcement "This elevator will stop at the 3rd floor, the 5th floor, the 6th floor, and the 7th floor before arriving at your floor registered by voice", for example.

In this manner, the elevator control unit 52 is configured to, when there has been a change in the stop floor included in the stop floor information, update the stop floor information such that the stop floor information includes the changed stop floor, and further perform the first announcement as the voice announcement that follows the updated stop floor information. Therefore, even when there has been a change in a stop floor at which the car stops before the car arrives at a destination floor registered by voice, a user who has input the destination floor to the voice input device 1 by voice can be notified of the changed stop floor.

The voice announcement to be performed by the elevator control unit 52 may be the second announcement instead of the first announcement.

According to the second embodiment described above, in addition to the configuration of the first embodiment, the following configuration is provided: when there has been a change in a stop floor at which the car stops before the car arrives at a destination floor corresponding to a voice car call after a voice announcement is performed, stop floor information is updated such that the stop floor information includes the changed stop floor, and a voice announcement that follows the updated stop floor information is performed again, With this configuration, even when there has been a change in a stop floor at which the car stops before the car arrives at a destination floor registered by voice, a visually impaired person can be notified of the changed stop floor.

Third Embodiment

In a third embodiment of the present invention, a description is given of a control device 5 configured to, in addition to the configuration of the first embodiment, compare the number of stop floors included in the stop floor information and a set threshold value set in advance, and switch the voice announcement between the first announcement and the second announcement depending a result of the comparison. In the third embodiment, a description of the same features as those of the first embodiment described above is omitted, and a difference from the first embodiment described above is mainly described.

Figure 4:
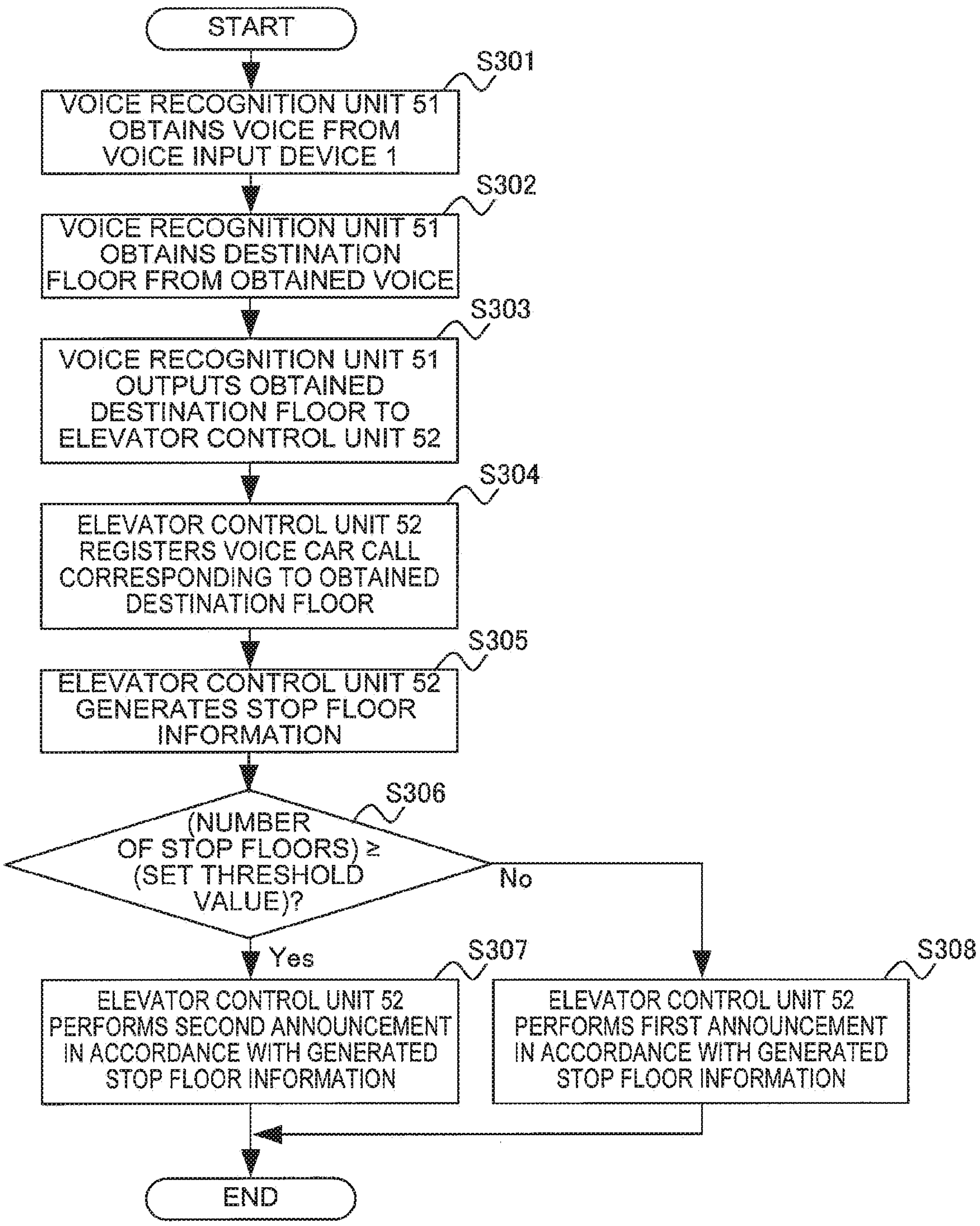
FIG. 4 is a flowchart for illustrating a series of processing steps to be performed by an elevator control device according to a third embodiment of the present invention.

FIG. 4 is a flowchart for illustrating a series of processing steps to be performed by the elevator control device 5 according to the third embodiment of the present invention. As illustrated in FIG. 4, the control device 5 sequentially executes processing steps of Step S301 to Step S305, which are similar to Step S101 to Step S105 of FIG. 2 described above, and the processing proceeds to Step S306.

In Step S306, the elevator control unit 52 determines whether or not the number of stop floors included in the stop floor information generated in Step S305 is equal to or larger than the set threshold value set in advance.

When it is determined in Step S305 that the number of stop floors is equal to or larger than the set threshold value, the processing proceeds to Step S307. Meanwhile, when it is determined in Step S305 that the number of stop floors is smaller than the set threshold value, the processing proceeds to Step S308.

In Step S307, the elevator control unit 52 performs the second announcement as the voice announcement that follows the stop floor information generated in Step S305, and the processing ends.

In Step S308, the elevator control unit 52 performs the first announcement as the voice announcement that follows the stop floor information generated in Step S305, and the processing ends.

As an example, it is assumed that a destination floor corresponding to the voice car call registered in Step S304 is the 10th floor and that stop floors included in the stop floor information generated in Step S305 are the 3rd floor, a 4th floor, the 5th floor, the 6th floor, the 7th floor, and a 9th floor. It is further assumed that the set threshold value is set to "5".

In the above-mentioned case, the number of stop floors included in the stop floor information is "6", and hence, in Step S306, the elevator control unit 52 determines that the number of stop floors is equal to or larger than the set threshold value. Further, in Step S307, the elevator control unit 52 gives, as the second announcement that follows the stop floor information, an announcement "This elevator will stop seventh at your floor registered by voice", for example.

As the number of stop floors included in the stop floor information becomes larger, a period of time for announcement required from start to end of the first announcement becomes longer, whereas a period of time for announcement required from start to end of the second announcement changes little. Thus, depending on the number of stop floors included in the stop floor information, the voice announcement is switched between the first announcement and the second announcement, which has a period of time for announcement shorter than that of the first announcement.

As described above, the elevator control unit 52 is configured to perform the first announcement as the voice announcement when the number of stop floors is smaller than the set threshold value, and perform the second announcement as the voice announcement when the number of stop floors is equal to or larger than the set threshold value. Therefore, even when the number of stop floors becomes larger, it is possible to prevent a period of time for announcement of the voice announcement from becoming longer.

The elevator control unit 52 may be configured to, in addition to the configuration of the second embodiment, switch the voice announcement between the first announcement and the second announcement depending on the number of stop floors included in the stop floor information.

According to the third embodiment described above, in addition to the configuration of each of the first and second embodiments, the following configuration is provided: when the number of stop floors included in the stop floor information is smaller than the set threshold value, the first announcement is performed as the voice announcement, and when the number of stop floors is equal to or larger than the set threshold value, the second announcement is performed as the voice announcement. With this configuration, even when the number of stop floors becomes larger, it is possible to prevent a period of time for announcement of the voice announcement from becoming longer.

Fourth Embodiment

In a fourth embodiment of the present invention, a description is given of a control device 5 configured to, in addition to the configuration of the first embodiment described above, compare a first period required from start to end of the first announcement and a second period required until the car arrives at a floor at which the car stops first after the registration of the voice car call, and to switch the voice announcement between the first announcement and the second announcement depending a result of the comparison.

Figure 5:
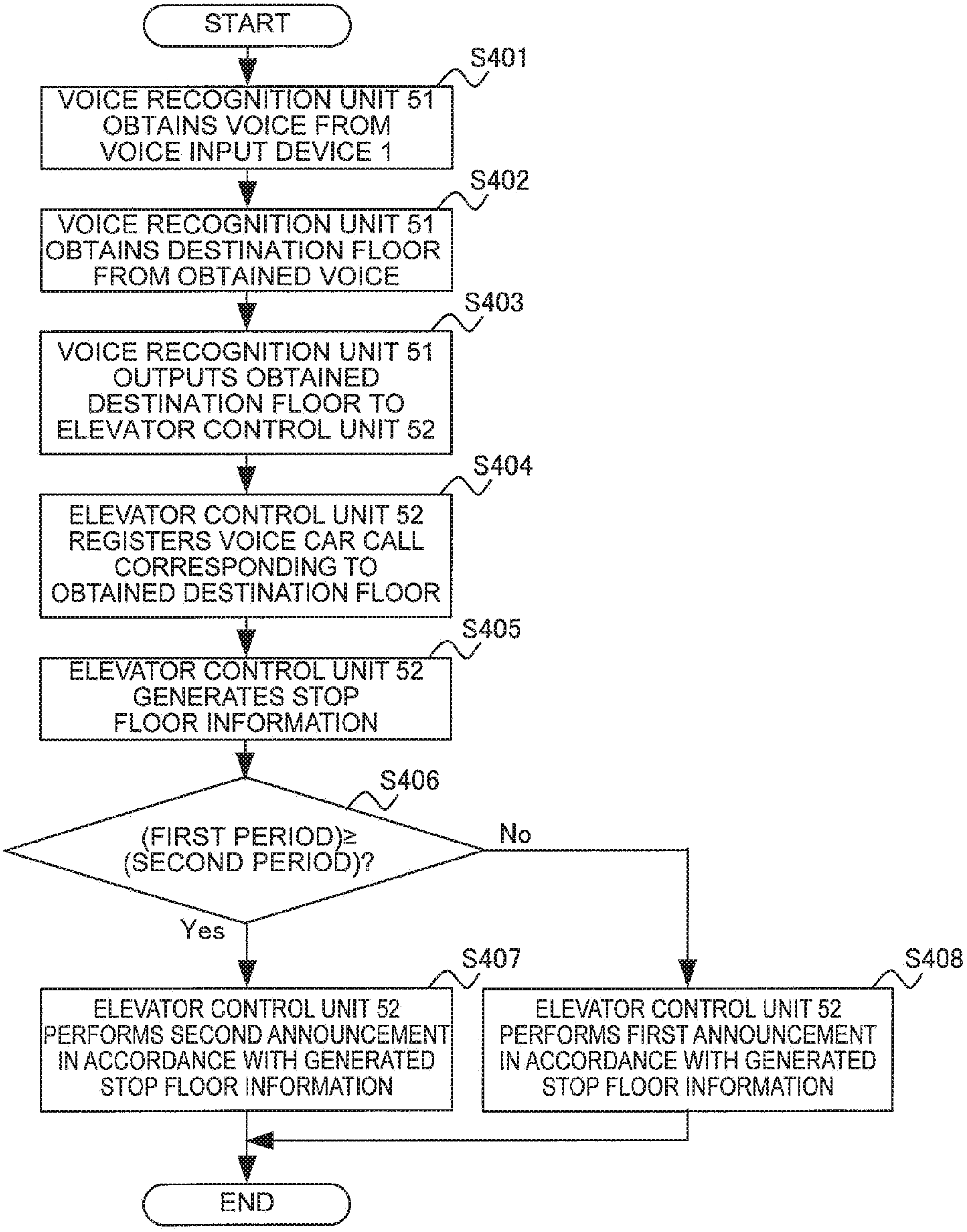
FIG. 5 is a flowchart for illustrating a series of processing steps to be performed by an elevator control device according to a fourth embodiment of the present invention.

FIG. 5 is a flowchart for illustrating a series of processing steps to be performed by the elevator control device 5 according to the fourth embodiment of the present invention. As illustrated in FIG. 5, the control device 5 sequentially executes processing steps of Step S401 to Step S405, which are similar to Step S101 to Step S105 of FIG. 2 described above, the processing proceeds to Step S406.

In Step S406, the elevator control unit 52 calculates, as the first period, a period of time for announcement required from start to end of the first announcement that follows the stop floor information generated in Step S405. The elevator control unit 52 also calculates, as the second period, a period of time required until the car arrives at a floor at which the car stops first among the stop floors included in the stop floor information after the registration of the voice car call.

Further, the elevator control unit 52 compares the calculated first and second periods with each other, and when the elevator control unit 52 determines that the first period is equal to or longer than the second period, the processing proceeds to Step S407. Meanwhile, when the elevator control unit 52 determines that the first period is shorter than the second period, the processing proceeds to Step S408.

In Step S407, the elevator control unit 52 performs the second announcement as the voice announcement that follows the stop floor information generated in Step S405, and the processing ends.

In Step S408, the elevator control unit 52 performs the first announcement as the voice announcement that follows the stop floor information generated in Step S405, and the processing ends.

In the case where the first period is equal to or longer than the second period, when the first announcement is performed, there is a possibility that the first announcement has not been finished yet although the car has arrived at the stop floor. Thus, depending on the result of comparison between the first period and the second period, the voice announcement is switched between the first announcement and the second announcement, which has a period of time for announcement shorter than that of the first announcement.

As described above, the elevator control unit 52 is configured to perform the first announcement as the voice announcement when the first period is shorter than the second period, and perform the second announcement as the voice announcement when the first period is equal to or longer than the second period. Therefore, it is possible to prevent occurrence of a situation in which the voice announcement has not been finished yet although the car has arrived at the stop floor.

The elevator control unit 52 may be configured to, in addition to the configuration of the second embodiment, switch the voice announcement between the first announcement and the second announcement depending on the result of comparison between the first period and the second period.

The elevator control unit 52 may also be configured to, in addition to the configuration of the third embodiment, switch the voice announcement between the first announcement and the second announcement depending on the result of comparison between the number of stop floors included in the stop floor information and the set threshold value and on the result of comparison between the first period and the second period. In this case, when the number of stop floors is smaller than the set threshold value and the first period is shorter than the second period, the elevator control unit 52 performs the first announcement as the voice announcement, and otherwise, performs the second announcement as the voice announcement.

According to the fourth embodiment described above, in addition to the configuration of each of the first to third embodiments described above, the following configuration is provided: when the first period is shorter than the second period, the first announcement is performed as the voice announcement, and when the first period is equal to or longer than the second period, the second announcement is performed as the voice announcement. With this configuration, it is possible to prevent occurrence of the situation in which the voice announcement has not been finished yet although the car has arrived at the stop floor.

Although the first to fourth embodiments have been individually described, the respective configuration examples disclosed in the first to fourth embodiments may be freely combined with one another.

REFERENCE SIGNS LIST

1 voice input device, 2 voice output device, 3 car call button, 4 landing call button, 5 control device, 51 voice recognition unit, 52 elevator control unit

The invention claimed is:

1. An elevator control device, comprising:

processor circuitry configured to perform as a voice recognition unit configured to recognize a destination floor of a user from a voice of the user input to a voice input device; and the processor circuitry further configured to perform as an elevator control unit configured to register a voice car call corresponding to the destination floor recognized by the voice recognition unit, generate stop floor information including a stop floor at which a car stops before the car arrives at the destination floor after the registration of the voice car call, and control a voice output device such that the voice output device performs a voice announcement based on the generated stop floor information, wherein the elevator control unit is configured to:

compare a number of stop floors included in the stop floor information and a set threshold value, which is set in advance; and perform, when the number of stop floors is smaller than the set threshold value, as the voice announcement, a first announcement for notifying of the stop floor in order of floors at which the car stops and perform, when the number of stop floors is equal to or larger than the set threshold value, as the voice announcement, a second announcement for notifying of how many floors the car stops at before arriving at the destination floor.

2. The elevator control device according to claim 1, wherein the elevator control unit is configured to, when there has been a change in the stop floor before the car arrives at the destination floor after the voice announcement is performed, update the stop floor information such that the stop floor information includes the changed stop floor, and perform again the voice announcement based on the updated stop floor information.

3. The elevator control device according to claim 1, wherein the elevator control unit is configured to:

compare a first period, which is required from start to end of the first announcement, and a second period, which is required until the car arrives at a floor at which the car stops first among the stop floors included in the stop floor information after the registration of the voice car call; and perform the first announcement as the voice announcement when the first period is shorter than the second period, and perform the second announcement as the voice announcement when the first period is equal to or longer than the second period.

4. The elevator control device according to claim 2, wherein the elevator control unit is configured to:

compare a first period, which is required from start to end of the first announcement, and a second period, which is required until the car arrives at a floor at which the car stops first among the stop floors included in the stop floor information after the registration of the voice car call; and perform the first announcement as the voice announcement when the first period is shorter than the second period, and perform the second announcement as the voice announcement when the first period is equal to or longer than the second period.

5. An elevator control method, comprising:

a voice recognition step of recognizing a destination floor of a user from a voice of the user input to a voice input device; and an elevator control step of registering a voice car call corresponding to the destination floor recognized in the voice recognition step, generating stop floor information including a stop floor at which a car stops before the car arrives at the destination floor after the registration of the voice car call, and controlling a voice output device such that the voice output device performs a voice announcement based on the generated stop floor information, wherein the elevator control step includes:

comparing a number of stop floors included in the stop floor information and a set threshold value, which is set in advance; and performing, when the number of stop floors is smaller than the set threshold value, as the voice announcement, one of a first announcement for notifying of the stop floor in order of floors at which the car stops, and performing, when the number of stop floors is equal to or larger than the set threshold value, as the voice announcement, a second announcement for notifying of how many floors the car stops at before arriving at the destination floor.

* * * * *